United States Patent [19]
Beckert et al.

[11] 3,977,990
[45] Aug. 31, 1976

[54] CONTROLLED GENERATION OF COOL HYDROGEN FROM SOLID MIXTURES

[75] Inventors: Werner F. Beckert, Las Vegas, Nev.; William H. Barber, Brandywine, Md.; Ottmar H. Dengel, Front Royal, Va.; Robert A. Robb, Bryans Road, Md.

[73] Assignee: The United States of America as represented by the Secretary of the Navy, Washington, D.C.

[22] Filed: Oct. 30, 1974

[21] Appl. No.: 519,312

[52] U.S. Cl. .......................... 252/188.3 R; 252/188; 423/648
[51] Int. Cl.² ...................... C01B 1/02; C01B 1/05
[58] Field of Search ........................ 252/188, 188.3; 423/646–648

[56] References Cited
UNITED STATES PATENTS

| | | | |
|---|---|---|---|
| 3,405,068 | 10/1968 | Hiltz | 252/188 X |
| 3,450,638 | 6/1969 | Edwards | 252/188 |
| 3,676,071 | 7/1972 | Speed | 252/188 X |
| 3,734,863 | 5/1973 | Beckert et al. | 252/188 |
| 3,862,052 | 1/1975 | Beckert et al. | 252/188.3 |

*Primary Examiner*—Benjamin R. Padgett
*Assistant Examiner*—David Leland

[57] ABSTRACT

The hydrogen gas evolution rates and the gas temperatures of certain hydrogen gas generating compositions are modified by adding compounds such as LiAlH$_4$ which thermally decompose in the reaction zone producing hydrogen while lowering the reaction temperature; and acetonates, metal oxides, and the like which, when added in relatively small amounts accelerate the hydrogen gas evolution rate.

19 Claims, No Drawings

CONTROLLED GENERATION OF COOL HYDROGEN FROM SOLID MIXTURES

BACKGROUND OF THE INVENTION

This invention relates to hydrogen gas generating compositions and more specifically to compositions for generating hydrogen gas at an adjustable rate and at relatively low temperatures.

Simple means for generating relatively small amounts of hydrogen gas are desirable for many applications. Examples are inflation of lighter-than-air devices such as balloons and buoyant markers. Obviously, hydrogen gas thus generated is also suitable for use as a reactant in chemical reactions. Parameters, which are critical for those and other applications, include the ratios of the volume of hydrogen gas generated to the weight and volume of the reactants, both ratios preferably being as high as possible. Other parameters are the hydrogen gas evolution rate, the hydrogen gas temperature, the expendability of the gas generating systems after use, or a combination of the above. As is readily apparent, conventional methods such as using a pressurized hydrogen gas cylinder or generating hydrogen from the reaction of metals or metal hydrides with acids or water do not meet the above criteria.

U.S. Pat. No. 3,734,863 to Beckert et al. issued May 22, 1973, which is incorporated herein by reference, describes a method for generating hydrogen gas on a small scale under conditions which satisfy most of the above parameters. The method is based on the reaction of ammonium or hydrazonium salts with suitable metal hydrides as expressed by the following general equations:

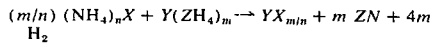

$(m/n) (NH_4)_n X + Y(ZH_4)_m \rightarrow YX_{m/n} + m\ ZN + 4m\ H_2$

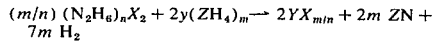

$(m/n) (N_2H_6)_n X_2 + 2y(ZH_4)_m \rightarrow 2YX_{m/n} + 2m\ ZN + 7m\ H_2$ where $X$ is an acid group such as an inorganic acid group like halogen (Cl, Br, F), sulfate ($SO_4$), and the like, $n$ is the valency of the acid group, $Y$ is a mono-or divalent metal capable of forming complex hydrides such as alkali and alkaline earth metals like Li, Na, K, Mg, Ba, Ca, etc., $m$ is the valency of said metal and $Z$ is a trivalent metal capable of forming complex hydrides such as B, Al, and the like.

Some of these reactions are highly exothermic as can be seen from the data in Table I, resulting in high gas temperatures.

TABLE I

| | CALCULATED HEATS OF REACTION | |
|---|---|---|
| | H(kcal) | H/mole $H_2$(kcal) |
| 1. $NH_4F + LiBH$ | −20.36 | −5.1 |
| 2. $NH_4F + LiAlH_4$ | −66.2 | −16.6 |
| 3. $NH_4Cl + LiAlH_4$ | −53.82 | −13.5 |
| 4. $NH_4CL + NaAlH_4$ | −53.5 | −13.4 |
| 5. $NH_4Br + LiAlH_4$ | −50.61 | −12.7 |
| 6. $NH_4I + NaAlH_4$ | −51.24 | −12.8 |
| 7. $N_2H_6Cl_2 + 2\ LiAlH_4$ | −168.4 | −24.1 |
| 8. $N_2H_6SO_4 + 2\ NaAlH_4$ | −160.7 | −23.0 |
| 9. $NH_4F \cdot HF + 2\ LiAlH_4$ | −107.1 | −16.5 |

Experimentally it is found that mixtures consisting of $NH_4Cl/NaAlH_4$ or $NH_4F/LiAlH_4$ in stoichiometric proportions and containing varying amounts of binder reliably produce hydrogen gas in a short time with yields between 0.7 and 1.0 l/g; 100 l of hydrogen can be produced in less than 15 seconds, using these mixtures. However, the recorded gas temperatures are as high as 500°C, or higher depending on the nature and amount of the material reacted and on the mode of firing. The high gas temperature prevents this hydrogen gas generating system from being used as a direct hydrogen source for balloon inflation, as outlined below.

In order to inflate a balloon with hydrogen the gas has to be relatively cool for two reasons:

1. The dependence of the mechanical properties of the balloon material on temperature sets an upper temperature limit.

Suitable balloon materials include natural or synthetic resins such as rubber, or polyethylene terephthalate (trademarked Mylar)

2. When a balloon is inflated to volume $V_o$ with hot hydrogen of temperature $T_o$ (°K) without over-pressurization, and the gas, after removal of the gas source, subsequently cools to temperature $T_1$ (°K), a volume decrease $\Delta V$ takes place which is, according to the ideal gas law, $$\Delta V = V_o \left(1 - \frac{T}{T_o}\right)$$

resulting in a lift decrease of $$\Delta L = \frac{-\Delta V \times 27(g)}{22.4}$$

The variety of applications for a composition which generates hydrogen gas requires both generation of hydrogen at a relatively low temperature and a means for either increasing or decreasing the rate of hydrogen evolution. An increasing rate of hydrogen evolution is desirable for inflation purposes and some chemical reactions. A decreasing rate of hydrogen evolution is useful for either gas laser applications, other chemicals reactions, or fuel cells. A composition, which has an adjustable gas evolution rate is desirable because of the simplicity of varying a standard composition compared to the difficulty of maintaining a variety of compositions for each individual use.

SUMMARY OF THE INVENTION

Therefore, it is an objective of this invention to provide a composition and method for generating relatively cool hydrogen gas.

Another object of this invention is to provide a relatively cool hydrogen gas generating composition which has a high hydrogen gas output per weight and volume units of the compositions.

A further object of this invention is to provide a relatively cool hydrogen gas generating composition which has a high hydrogen gas output per weight and volume unit of the compositions and which can be modified to adjust the hydrogen gas evolution rates within certain limits.

It is a still further object of this invention to provide compositions for generating relatively cool hydrogen gas having a maintained pressurizing ability.

Also, it is an object of this invention to provide compositions for generating relatively cool hydrogen gas suitable for use with light duty materials.

Another object of this invention is to provide compositions for generating relatively cool hydrogen gas suitable for use as a propellant composition.

Yet another object of this invention is to provide a composition for generating relatively cool hydrogen gas suitable for use in a chemical reaction.

These and other objects are accomplished by adding by hydrogen gas generating compositions a compound or a combination of compounds such as $LiAlH_4$, $LiBH_4$, $MgH_2$, or $AlH_3$, which decompose in the reaction zone while producing hydrogen gas; and by further adding small amounts of certain metals, metal oxides, organometallic compounds, metal chelates, or mixtures thereof which influence the evolution rate of the generated hydrogen gas.

DESCRIPTION OF THE PREFERRED EMBODIMENTS

A hydrogen generating composition is cooled, by the addition of compounds which thermally decompose in the reaction zone to produce hydrogen, and has the rate of evolution adjusted by addition of metals, metal oxides, or organometallic compounds.

The composition results in the temperature of the hydrogen gas being lowered, without significantly lowering the hydrogen gas yield per gram of the hydrogen gas generating composition, by adding compounds such as $LiAlH_4$, $LiBH_4$, $MgH_2$, or $AlH_3$ which thermally decompose in the reaction zone and ultimately produce hydrogen. The resulting lower gas temperature is caused by two factors:
  a. the decomposition reactions of the added compounds are more or less endothermic thus using up part of the heat generated by the basic reaction;
  b. the added compounds and their decomposition products act as a heat sink.

The thermally decomposable compounds are added to hydrogen gas generating compositions such as those of U.S. Pat. No. 3,734,863 above referenced.

Table II presents calculated heats of reaction for some systems where an excess of $LiAlH_4$ is used to lower the gas temperature.

TABLE II

INFLUENCE OF EXCESS HYDRIDES ON HEATS OF REACTION (CALCULATED VALUES)

| No. | COMPOSITION | ΔH(kcal) | ΔH/mole H₂(kcal) |
|---|---|---|---|
| 1. | $NH_4F + 3\ LiAlH_4$ | −56.5 | −8.1 |
| 2. | $NH_4F + 4\ LiAlH_4$ | −52.0 | −6.1 |
| 3. | $NH_4Cl + NaAlH_4 + LiAlH_4$ | −49.0 | −8.9 |
| 4. | $NH_4Cl + NaAlH_4 + 2\ LiAlH_4$ | −44.5 | −6.4 |
| 5. | $NH_4Cl + NaAlH_4 + 3\ LiAlH_4$ | −39.9 | −4.7 |

Yield, temperature, and rate of gas evolution of these systems depend on nature, ratio and total amount of the components, as illustrated in Table III by experimental data. The stability of the mixtures varies according to composition; the initiation temperature $T_i$ of No. 3 in Table III was 84.5°C, $T_i$ of No. 6 was found to be between 121° and 128.5°C. Impact, sliding friction and electrostatic tests on compositions No. 3 and No. 6 show them to be of medium sensitivity.

As can be seen from the information outlined above, mixture No. 6 in Table III, most promising with respect to stability, yield, and temperature, requires approximately 18 seconds for the generation of 66 l of hydrogen gas. Based on analogies, the evolution time for 120 l of hydrogen gas or more using this composition was projected to be 24 seconds or higher, whereas for some applications (e.g. in-flight inflation of lighter-than-air markers) an evolution time of less than 15 seconds is required.

TABLE III

CORRELATION BETWEEN COMPOSITION AND YIELD, TEMPERATURE AND EVOLUTION TIME

| No. | Composition | % Binder | Mode of Firing | Amount Fired (g) | Maximum Gas Temperature | Total Gas l | Yield l/g | Evolution Time Seconds |
|---|---|---|---|---|---|---|---|---|
| 1 | 1 $NH_4F$, 1.3 $LiAlH_4$ | — | Hot Wire | 21.15 | 475°C | 23.7 | 1.12 | 2 |
| 2 | 1 $NH_4F$, 3 $LiAlH_4$ | 1 | Hot Wire | 53.0 | 350 | 56.3 | 1.06 | 6 |
| 3 | 1 $NH_4F$, 4 $LiAlH_4$ | 1 | SCID* | 61.7 | 245 | 52.0 | 0.84 | 7 |
| 4 | 1 $NH_4F$, 5 $LiAlH_4$ | 1 | Hot Wire | 59.3 | 175 | 47.3 | 0.80 | 27 |
| 5 | 1 $NH_4Cl$, 1 $NaAlH_4$, 1 $LiAlH_4$ | 1 | SCID | 20.0 | 290 | 16.0 | 0.80 | 10.5 |
| 6 | 1 $NH_4Cl$, 1 $NaAlH_4$, 2 $LiAlH_4$ | 4 | SCID | 81 | 235 | 65.9 | 0.81 | 18 |
| 7 | 1 $NH_4Cl$, 1 $NaAlH_4$, 3 $LiAlH_4$ | 1 | SCID | 61.6 | 150 | 44.0 | 0.71 | 60 |
| 8 | 1 $NH_4Cl$, 1 $NaAlH_4$, 4 $LiAlH_4$ | 1 | SCID | 65.9 | 125 | 32.6 | 0.49[(1)] | 45 |

[(1)]Reaction apparently incomplete
*Igniter in lead tube

In order to adjust the hydrogen generation rate, small amounts of certain chemical compounds, or mixtures thereof, which can significantly influence the hydrogen evolution rate of the above mixtures are added thereto. These compounds comprise a wide variety of chemical compositions.

In general, all compounds tested consisting of a metal or metal oxide radical combined with organic ligands such as the acetylacetonates, influence generation rates when about 5% are added to the basic mixtures. Most of these compounds produce a rate increase. Only thorium acetylacetonate, and to a lesser degree titanyl acetylacetonate, zirconium acetylacetonate, and ferrocene show a distinct rate decrease.

While most oxides tested show no or little activity, iron (III) oxide, silver oxide, and silicium dioxide (as Cab-o-sil) proved to be very active. Platinum dioxide, which is known to be easily reduced to finely divided platinum, a hydrogenation catalyst, caused a spontaneous decomposition of the mixtures during preparation at ambient temperature in the dry box atmosphere. Finely divided palladium metal causes a similar decomposition, whereas rhodium metal on charcoal and palladium chloride have little effect. The following compounds produce a significant hydrogen gas evolution rate increase when 5% by weight are incorporated into a mixture of $NH_4Cl + NaAlH_4 + LiAlH_4$ (molar ratios 1:1:2): Chromium acetylacetonate, cobalt(II) acetylacetonate, copper(II) acetylacetonate, iron(II) acetylacetonate, iron(III) acetylacetonate, manganic acetylacetonate, molybdenyl (VI) acetylacetonate, nickel acetylacetonate, uranyl acetylacetonate, vanadium acetylacetonate, vanadyl acetylacetonate, zinc acetylacetonate, iron(III) oxide, platinum dioxide, silicium dioxide (Cab-O-Sil) silver oxide, palladium metal powder, silver carbonate.

The following compounds produce a moderate hydrogen gas evolution rate increase when 5% by weight were incorporated into a mixture of $NH_4Cl + NaAlH_4 + LiAlH_4$ (molar ratios 1:1:2): Barium acetylacetonate, calcium acetylacetonate, lanthanum chloranilate, nickel benzoylacetonate, palladium chloride, copper(I) oxide.

The following compounds produce no detectable hydrogen gas evolution rate change when 5% by weight are incorporated into a mixture of $NH_4Cl + NaAlH_4 + LiAlH_4$ (molar ratios 1:1:2): Aluminum oxide, barium oxide, calcium oxide, copper-chromium oxide, magnesium oxide, vanadium pentoxide, amorphous boron powder, 5% rhodium on charcoal, silver powder, tungsten powder, chromium trichloride, copper(I) bromide, ammonium vanadate, nickel chromate.

The following compounds produce a moderate hydrogen gas evolution rate decrease when 5% by weight are incorporated into a mixture of $NH_4Cl + NaAlH_4 + LiAlH_4$ (molar ratio 1:1:2): Ferrocene, (titanyl acetylacetonate, zirconium acetylacetonate, thorium oxide, titanium dioxide, iron powder (reduced), uranium tetrachloride.

The following compound produces a significant hydrogen gas evolution rate decrease when 5% by weight is incorporated into a mixture of $NH_4Cl + NaAlH_4 + LiAlH_4$ (molar ratio 1:1:2): Thorium acetylacetonate.

Use of an optional binder greatly improves the mechanical properties of the material; up to 10% of butylstyrene or isobutylstyrene copolymer only slightly influences yield, rate and temperature. Addition of up to 30% of the binder level of CONCO oil, a plasticizer, further improves the mechanical properties of the grain, again without drastically influencing yield, rate, and temperature. Small particle sizes ($<100\mu$) of the ingredients are desirable especially for the components of the basic reaction. Larger particle sizes generally decrease rate and yield significantly. Applications of pressure to obtain various shapes of the material increase density up to 97% of the theoretical value. Rate and yield generally decrease with increasing density. Thus, by varying the amount of the endothermically decomposing component and the kind and amount of the secondary additive, as well a by varying the particle sizes of the ingredients and the density of the final composition, hydrogen gas evolution rate and temperatures are tailored for specific purposes. Other suitable binders are useful, such as those listed in the above cited patent. Plasticizers and solvents are variable also, based on the suitability for the process. Although in general a small particle size of up to 100 microns is desirable to obtain a fast and nearly complete reaction, large particle sizes might be useful for special purposes, e.g., to slow down the reaction, or to obtain a specific grain structure.

The additives or mixtures of additives can be added during the mixing process, or they can be added during the blending step, after evaporation of the solvent.

A number of mixing and shaping techniques can be used, depending on the nature of the material, such as inert diluent or pneumatic mixing, casting or extrusion, etc.

After generation, the hydrogen is optionally cooled further by heat exchangers and/or heat sink arrangements containing materials with a high specific heat such as copper, nickel, or cobalt, or materials which exhibit an endothermic phase change between ambient and the desired temperature, such as low-melting materials which preferably have high heats of fusion and heat capacities (Wood's metal, Rose's metal, or chemical compounds such as $Na_2HPO_4.12H_2O$) or low-boiling liquids.

The following examples are intended to illustrate the invention without unduly limiting the invention.

EXAMPLE I

A mixture of ammonium chloride, sodium aluminum hydride, and lithium aluminum hydride with isobutylstyrene copolymer as binder and CONCO oil as plasticizer, and 5% by weight of iron (III) oxide as additive, pressed into the desired shape and fired in a suitable aluminum gas generator produces gas in excess of 120 l at a temperature below 250°C in 10–15 seconds at a yield of approximately 0.8 l/g. Thus; this material is especially suitable for in-flight inflations of lighter-than-air markers and similar purposes where fast hydrogen generation is required.

The material is prepared in a drybox as a slurry of the components with the binder and the plasticizer dissolved in toluene as solvent; after evaporation of the solvent, the material is ground in a blender before pressing. The reaction is started as outlined in U.S. Pat. No. 3,734,863, incorporated herein by reference.

EXAMPLE II

The procedure of Example I is repeated substituting other additives for the iron (III) oxide. The results are summarized in Table IV.

TABLE IV

| INFLUENCE OF ADDITIVES ON GAS EVOLUTION RATE[1] | |
|---|---|
| COMPOUND | EFFECT[2] |
| Barium acetylacetonate | + |
| Calcium acetylacetonate | + |
| Chromium acetylacetonate | +++ |
| Cobalt(II) acetylacetonate | +++ |
| Copper(II) acetylacetonate | +++ |
| Iron(II) acetylacetonate | +++ |
| Iron(III) acetylacetonate | +++ |
| Ferrocene | − |
| Lanthanum chloranilate | + |
| Manganic acetylacetonate | +++ |
| Molybdenyl(VI) acetylacetonate | +++ |
| Nickel acetylacetonate | +++ |
| Nickel benzoylacetonate | + |
| Thorium acetylacetonate | −−− |
| Titanyl acetylacetonate | − |
| Uranyl acetylacetonate | +++ |
| Vanadium acetylacetonate | +++ |
| Zinc acetylacetonate | +++ |
| Vanadyl acetylacetonate | +++ |
| Zirconium acetylacetonate | − |
| Aluminum oxide | 0 |
| Barium oxide | 0 |
| Calcium oxide | 0 |
| Copper-Chromium oxide | 0 |
| Copper(I) oxide | + |
| Iron(III) oxide | +++ |
| Magnesium oxide | 0 |
| Platinum oxide | +++ |
| Silicium dioxide(Cab-O-Sil) | +++ |
| Silver oxide | +++ |
| Thorium oxide | − |
| Titanium dioxide | − |
| Vanadium pentoxide | 0 |
| Boron, amorphous | 0 |
| Iron powder, reduced | − |
| Palladium | +++ |
| 5% Rhodium on charcoal | 0 |
| Silver | 0 |
| Tungsten | 0 |
| Chromium trichloride | 0 |
| Copper(I) bromide | 0 |
| Palladium chloride | + |
| Uranium tetrachloride | − |
| Ammonium vanadate | 0 |
| Nickel chromate | 0 |

TABLE IV-continued

INFLUENCE OF ADDITIVES ON GAS EVOLUTION RATE[1]

| COMPOUND | EFFECT[2] |
|---|---|
| Silver carbonate | +++ |

[1] 5% of the additive incorporated into a $NH_4Cl/NaAlH_4/LiAlH_4$ mixture
[2] +++ — significant rate increase
+ — moderate rate increase
0 — no detectable rate change
− − moderate rate decrease
−−− — significant rate decrease Obviously numerous modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. In a hydrogen gas generating composition comprising (1) a hydride having the formula $Y(ZH_4)_m$ wherein Y is a mono- or divalent metal capable of forming complex hydrides and is selected from the group consisting of alkali metals and alkaline earth metals, $m$ is the valency of said mono- or divalent metal and Z is a trivalent metal capable of forming complex hydrides and is selected from the group consisting of boron and aluminum, or mixtures of said hydrides; and (2) a hydrogen producing reactant having the formula $(NH_4)_nX$ wherein X is an inorganic acid group and $n$ is the valency of said inorganic acid group, and mixtures of said compounds, wherein components (1) and (2) are present in stoichiometric amounts in the hydrogen gas generating composition, the improvement comprising the incorporation in said composition of at least one metal hydride coolant which decomposes endothermically to produce hydrogen gas; and a reaction rate modifier selected from the group consisting of the acetylacetonates of barium, calcium, chromium, cobalt (II), copper (II), iron (II), iron (III), manganese (III), nickel, vanadium, and zinc; molybdenyl (VI) acetylacetonate; uranyl acetylacetonate; vanadyl acetylacetonate; ferric oxide; platinum dioxide; silicon dioxide; silver oxide; palladium metal powder; silver carbonate; lanthanum chloranilate; nickel benzoylacetonate; cuprous oxide; palladium chloride; and mixtures thereof.

2. The composition of claim 1 wherein the reaction rate modifier is selected from the group consisting of the acetylacetonates of chromium, cobalt (II), copper (II), iron (II), iron (III), manganese (III), nickel, vanadium and zinc; molybdenyl (VI) acetylacetonate, uranyl acetylacetonate; vanadyl acetylacetonate; ferric oxide; platinum dioxide; silicon dioxide; silver oxide; palladium metal powder; and silver carbonate.

3. The composition of claim 1 wherein the reaction rate modifier comprises up to about 10% by weight of said composition.

4. The composition of claim 3 wherein said hydride is $NaAlH_4$, said hydrogen producing reactant is $NH_4Cl$, said coolant is $LiAlH_4$ and said rate modifier is ferric oxide.

5. The composition of claim 4 wherein said rate modifier comprises about 5% by weight of said composition.

6. The composition of claim 1 wherein the reaction rate modifier is selected from the group consisting of the acetylacetonates of barium and calcium; lanthanum chloranilate; nickel benzoylacetonate; cuprous oxide; and palladium chloride.

7. In a hydrogen gas generating composition comprising (1) a hydride having the formula $Y(ZH_4)_m$ wherein Y is a mono- or divalent metal capable of forming complex hydrides and is selected from the group consisting of alkali metals and alkaline earth metals, $m$ is the valency of said mono- or divalent metal and Z is a trivalent metal capable of forming complex hydrides and is selected from the group consisting of boron and aluminum, or mixtures of said hydrides; and (2) a hydrogen producing reactant having the formula $(NH_4)_nX$ wherein X is an inorganic acid group and $n$ is the valency of said inorganic acid group, and mixtures of said compounds, wherein components (1) and (2) are present in stoichiometric amounts in the hydrogen gas generating composition, the improvement comprising the incorporation in said composition of at least one metal hydride coolant which decomposes endothermically to produce hydrogen gas; and a reaction rate modifier selected from the group consisting of the acetylacetonates of thorium and zirconium; titanyl acetylacetonate; ferrocene; thorium oxide; titanium dioxide reduced iron powder; uranium tetrachloride; and mixtures thereof.

8. The composition of claim 7 wherein said coolant is selected from the group consisting of $LiAlH_4$, $LiBH_4$, $MgH_2$ and $AlH_3$.

9. The composition of claim 7 wherein the reaction rate modifier comprises up to about 10% by weight of said composition.

10. The composition of claim 8 wherein said hydride is $NaAlH_4$, said hydrogen producing reactant is $NH_4Cl$, said coolant is $LiAlH_4$ and said rate modifier is thorium acetylacetonate.

11. The composition of claim 9 wherein said modifier comprises about 5% by weight of said composition.

12. The composition of claim 7 wherein the reaction rate modifier is selected from the group consisting of zirconium acetylacetonate, titanyl acetylacetonate, ferrocene, thorium oxide, titanium dioxide, reduced iron powder and uranium tetrachloride.

13. The composition of claim 1 wherein said coolant is selected from the group consisting of $LiAlH_4$, $LiBH_4$, $MgH_2$ and $AlH_3$.

14. The composition of claim 1 further comprising a binder up to about 15% by weight of said composition thereby forming a solid gas generating composition.

15. The composition of claim 14 additionally comprising a suitable plasticizer up to about 30% by weight of said binder thereby improving the mechanical properties of said solid gas generating composition.

16. The composition of claim 14 wherein said binder comprises an isobutyl/styrene copolymer.

17. The composition of claim 7 further comprising a binder up to about 15% by weight of said composition thereby forming a solid gas generating composition.

18. The composition of claim 17 additionally comprising a suitable plasticizer up to about 30% by weight of said binder thereby improving the mechanical properties of said solid gas generating composition.

19. The composition of claim 17 wherein said binder comprises an isobutyl/styrene copolymer.

* * * * *